(12) United States Patent
Okamoto

(10) Patent No.: US 6,502,411 B2
(45) Date of Patent: Jan. 7, 2003

(54) REMOTE INSPECTION AND CONTROL OF REFRIGERATOR

(75) Inventor: Takehisa Okamoto, Takatsuki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 8 days.

(21) Appl. No.: 09/948,768

(22) Filed: Sep. 10, 2001

(65) Prior Publication Data

US 2002/0029575 A1 Mar. 14, 2002

(30) Foreign Application Priority Data

Sep. 11, 2000 (JP) ........................ 2000-274902

(51) Int. Cl.[7] .................. G05D 23/00; G01K 13/00
(52) U.S. Cl. ........................... 62/129; 236/51
(58) Field of Search .................. 62/129, 125, 127; 236/51; 340/870.17, 584, 585; 700/275, 276, 277

(56) References Cited

U.S. PATENT DOCUMENTS 3,736,765 A * 6/1973 O'Dell ..................... 62/127
4,038,061 A * 7/1977 Anderson et al. ............ 62/126
4,829,779 A * 5/1989 Munson et al. .............. 62/175
5,279,458 A * 1/1994 DeWolf et al. ............... 236/47
5,435,147 A * 7/1995 Mochizuki et al. ........... 62/175
5,460,006 A * 10/1995 Torimitsu .................... 62/127
5,495,722 A * 3/1996 Manson et al. ............... 62/125
5,708,223 A * 1/1998 Wyss ...................... 73/865.9
5,745,049 A * 4/1998 Akiyama et al. ........ 340/870.17
6,064,310 A * 5/2000 Busak et al. ................ 340/588
6,332,327 B1 * 12/2001 Street et al. ................. 62/127
2001/0048376 A1 * 12/2001 Maeda et al. .......... 340/870.17

* cited by examiner

Primary Examiner—Denise L. Esquivel
Assistant Examiner—Marc Norman

(57) ABSTRACT

A remote inspection device for a refrigerator receives information about an operating state of the refrigerator transmitted from the refrigerator via a communication network continuously or at predetermined intervals. The remote inspection device further inspects the refrigerator on the basis of the received information.

28 Claims, 13 Drawing Sheets

REMOTE INSPECTION AND CONTROL OF REFRIGERATOR

BACKGROUND OF THE INVENTION

1. Field of the Invention

This invention relates to remote inspection of an operating state of a refrigerator and control of the refrigerator to be inspected.

2. Description of the Related Art

Conventional refrigerators have been provided with temperature sensors for detecting temperatures in storage compartments and an outside air temperature respectively, a drive circuit for a damper controlling supply of cold air into a temperature-changeable compartment, a drive circuit for an interior cooling fan, etc. A refrigerating operation cannot be carried out according to a set temperature when the above-mentioned temperature sensors and drive circuits have failed. In view of this problem, the conventional refrigerators include a self-diagnosis function provided in a control circuit for diagnosing the foregoing temperature sensors and drive circuits. An indication of occurrence of an abnormal condition is displayed on a display panel provided on a refrigerator door when a result of the self-diagnosis is out of a normal range determined for each diagnostic item. When viewing the display panel, the user finds the occurrence of the abnormal condition, inquiring of a maker or a distributor or requesting repair.

However, the conventional refrigerator has the following inconveniences. The refrigerator is kept under operation day and night to maintain food stored therein at a set temperature in houses and offices. The refrigerators differ from many of the other electric appliances in this respect. Upon occurrence of an abnormal condition, the refrigerator cannot normally be operated until a serviceman inspects and repairs the refrigerator. As a result, the temperature of the food stored in the refrigerator rises during the inspection and repair such that the freshness of the food is reduced or the food becomes rotten.

Furthermore, when an improper use of the refrigerator results in an abnormal condition, for example, even when the temperature in the refrigerator rises due to an incomplete closure of the refrigerator door, the user sometimes erroneously recognizes the abnormal condition as a failure, requesting useless repair.

When a failure has actually occurred, the serviceman previously telephones the user to get information about the abnormal condition or the contents displayed on the display panel. However, the information is sometimes insufficient for the user to clearly understand the failure in detail. Accordingly, the serviceman does not inspect the cause for the failure until he or she visits the house or office. The repair requires a long period of time in this case.

Additionally, no suitable parts or components can be prepared in a first visit since the serviceman has a difficulty in specifying the location of failure on the basis of explanation by the user. As a result, the serviceman needs to visit the house or office several times or arrangements of new parts or components are delayed. Consequently, the repair further necessitates a lot of time. Since much of food cannot be stored without use of a refrigerator, the repair taking a long period of time forces the user into inconvenience.

SUMMARY OF THE INVENTION

Therefore, an object of the present invention is to provide a device, method and system for remote inspection of a refrigerator which can cope with the occurrence of an abnormal condition of the refrigerator quickly and suitably, and a refrigerator which can reduce an adverse effect of the abnormal condition on food stored therein, a method of controlling the refrigerator, a recording medium on which an operation program of the refrigerator is recorded, and the operation program of the refrigerator.

The present invention provides a method of remote inspection for a refrigerator, comprising receiving information about an operating state of the refrigerator transmitted from the refrigerator via a communication network continuously or at predetermined intervals, and inspecting the refrigerator on the basis of the received information, transmitting an inspection program via the communication network to the refrigerator and executing the inspection program when an indication of an abnormal condition is detected regarding the operating state of the refrigerator.

Refrigerators are kept under operation day and night to maintain food stored therein at a set temperature in houses and offices. The refrigerators differ from many of the other electric appliances in this respect. Accordingly, when an abnormal condition, for example, a condition where an interior temperature is high is prolonged, the freshness of the food stored in the refrigerator is reduced. Furthermore, cooking undergoes great inconvenience when food cannot be kept cool.

According to the above-described method, the refrigerator installed in a house or office transmits the information about the operating condition thereof continuously or at predetermined intervals. The operating state of the refrigerator is inspected on the basis of the information transmitted by the refrigerator. Consequently, the occurrence of an abnormal condition and an indication of abnormal condition can quickly be found without intervention of the user and accordingly, a quick and suitable measure can be taken against the abnormal condition. Accordingly, disadvantage and inconvenience the user suffers from the abnormal condition of the refrigerator can be minimized.

Furthermore, the serviceman can presume or specify a cause for the abnormal condition on the basis of the information about the operating condition of the refrigerator. Accordingly, since the serviceman can arrange for parts or components to be replaced by prior to visit to the user's home for repair, necessary parts or components can be brought to the user's home at a first visit and accordingly, a repairing time can be reduced. Additionally, information about an abnormal condition or failure occurred in the market can intensively be managed. As a result, an accuracy in the remote inspection of the refrigerator can further be improved by utilizing the intensive information.

A terminal unit may be provided between the refrigerator and the communication network so that the terminal unit obtains the information about the operating state from the refrigerator and transmits the obtained information. In this case, since the terminal unit is a main device for communication, the refrigerator is only provided with communication means with a relatively simple arrangement. Consequently, an increase in the cost can be rendered smaller.

When an indication of abnormal condition is detected regarding the operating state of the refrigerator, an inspection program may be transmitted via the communication network to the refrigerator so that the refrigerator executes the inspection program. Accordingly, since the inspection program for various indications of abnormal conditions to be forecast need not be stored in control means of the refrigerator, an optimum inspection according to the indication of abnormal condition can automatically be carried out remotely.

When an indication of abnormal condition is detected regarding the operating state of the refrigerator, a compensating operation program may be transmitted via the communication network to the refrigerator, and the refrigerator may execute the compensating operation program. According to the method, the refrigerator executes an emergency compensating operation (a forced refrigerating operation, for example) according to the compensating operation program to recover the refrigerator from the indication of abnormal condition (an increase in the interior temperature, for example). Accordingly, the refrigerator can be maintained in the normal or quasi-normal condition until a concrete measure is taken. Consequently, damage to the food stored in the refrigerator can be prevented from being increased. The compensating program can cope with version-up or renewal of a control program at the time of shipment, changes in parameters and an operating mode, and the refrigerator can automatically be recovered from the state where the indication of abnormal condition has occurred.

By referring to a data base regarding the operating state of each type of the refrigerator to be inspected, it can be determined whether an abnormal condition appeared in the operating state of the refrigerator results from a failure of the refrigerator or an improper use of the refrigerator by a user. Consequently, the two causes for the abnormal condition of the refrigerator can reliably be coped with although the causes differ from each other in nature.

When it is determined that the abnormal condition results from the improper use of the refrigerator by the user, information indicative of the improper use of the refrigerator may be transmitted via the communication network to the refrigerator. Since the user finds that the abnormal condition results from the improper use of the refrigerator by the user, the improper use can quickly be interrupted such that the abnormal condition is resolved. Additionally, an unnecessary request of repair can be prevented.

When it is determined that the abnormal condition results from a failure of the refrigerator, a location of the failure may be specified by referring to a data base. Consequently, the serviceman can previously arrange parts or components with respect to the location of the failure. Further, since the location of the failure is previously specified, the serviceman can carry all the parts or components necessary for repair with him when visiting the user's home, for example. Consequently, the serviceman can immediately start the repair upon arrival at the user's home and the refrigerator can quickly be repaired.

An emergency operation program may be transmitted via the communication network to the refrigerator when it is determined that the abnormal condition results from the failure of the refrigerator. The refrigerator is operated according to the emergency operation program until the repair is completed. Accordingly, the refrigerator can be maintained in the normal or quasi-normal condition. Consequently, damage to the food stored in the refrigerator and inconvenience against the user can be rendered minimum.

In this case, when information indicative of occurrence of failure is transmitted to the refrigerator, the user can reliably find that the refrigerator is in the abnormal condition, based on the information. Consequently, the user can take an emergency measure independently.

When information indicative of an emergency measure is transmitted via the communication means to the refrigerator, the user follows the emergency measure such that damage to the stored food can be rendered minimum.

BRIEF DESCRIPTION OF THE DRAWINGS

Other objects, features and advantages of the present invention will become clear upon reviewing the following description of an embodiment, made with reference to the accompanying drawings, in which.

DETAILED DESCRIPTION OF AN EMBODIMENT

Figure 1:
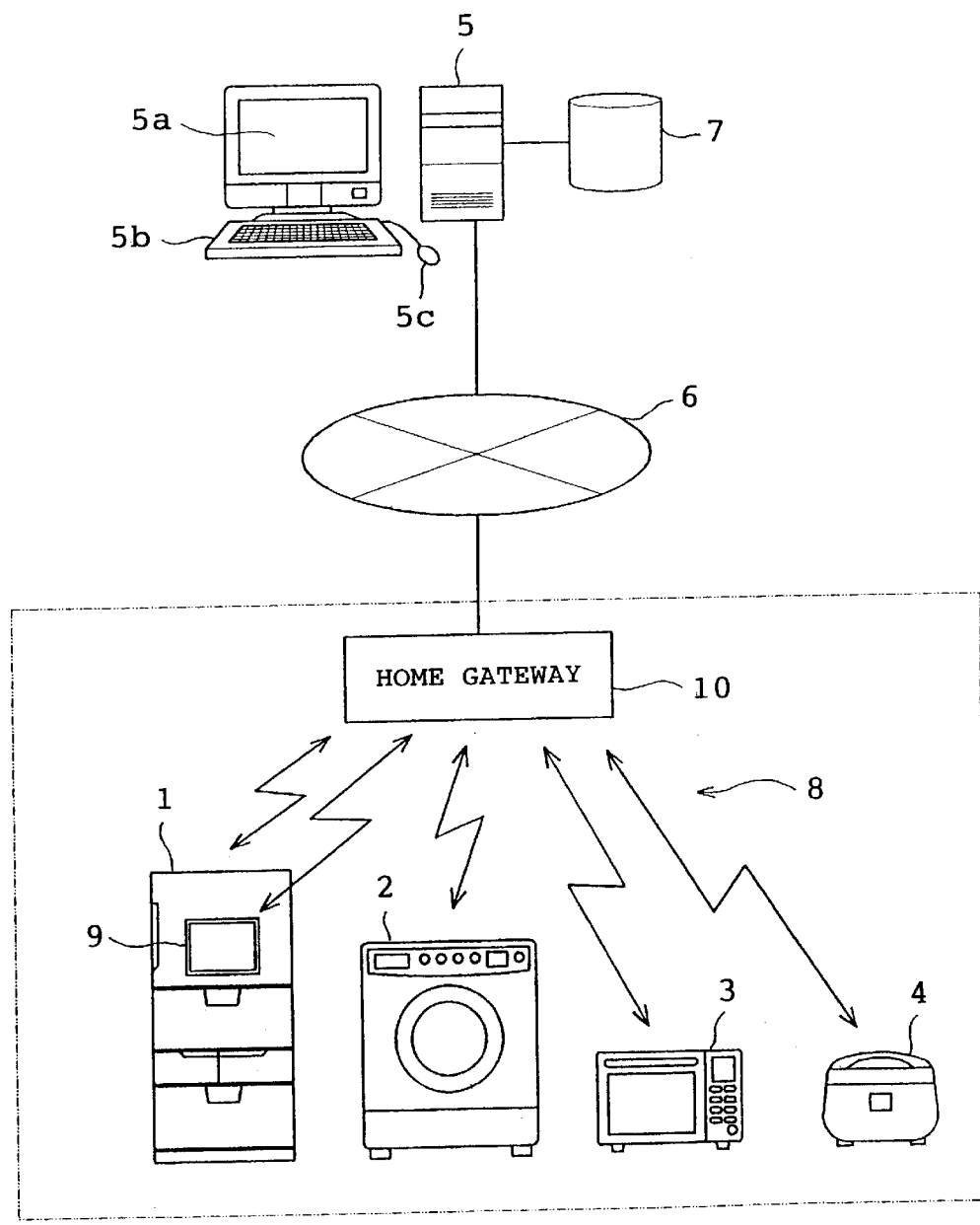
FIG. 1 is a schematic view of a remote inspection system of an embodiment in accordance with the present invention.

One embodiment of the present invention will be described with reference to the accompanying drawings. Referring to FIG. 1, a remote inspection system of the embodiment in accordance with the invention is shown. A manufacturer of household electric appliances such as a refrigerator 1, washing machine 2, microwave oven 3 and electric rice cooker 4 opens a Web site on an Internet 6 with a Web server 5. The Web site is normally renewed and accessed to so that various pieces of information useful for the foregoing household electric appliances can be obtained. The Web server 5remote inspects household electrical appliances in every home or more particularly, a refrigerator 1 in every home as well as supplies information by the Web site. The Web server 5 serving as remote inspection means includes communication means carrying out communication via the Internet 6 serving as a communication network, inspection means for remote inspecting the household electric appliances, and a diagnosis data base 7 required for inspection.

The refrigerator 1 is kept under operation day and night. Upon occurrence of an abnormal condition in the refrigerator 1, the temperature of food stored in the refrigerator is increased such that the freshness of the food is reduced or the food cannot be stored in the refrigerator. The Web server 5 then receives information about an operating state of the refrigerator 1 and remote inspects the refrigerator 1 on the basis of the received information. Thus, the Web server 5 inspects the refrigerator 1, detects failure, transmits an execution program to the refrigerator 1 and transmits information to the user.

The diagnosis data base 7 stores data required for inspection of the refrigerator, namely, operation patterns of types of the refrigerator 1, standard data of operating state (interior temperature etc), and reasoning data for specifying a cause for failure from an actual operation pattern and detected operating state. A display 5a, key board 5b and mouse 5c are connected to the Web server 5 installed in a household electric appliance manufacturer or a maintenance service company. Servicemen or engineers use these input and output devices to input and output the information about the operating state, information about request for dispatch of serviceman, various programs and message data.

Each of the foregoing household electric appliances is provided with communication means, so that a home LAN 8 can be constructed in a home when a dweller purchases one or more of the appliances. The home LAN 8 includes as a main component a home terminal 9 serving as a terminal unit. The home terminal 9 is provided with communication means and serves as a home server. More specifically, the home terminal 9 communications with each electric appliance via a home gateway 10. The home terminal 9 further accesses via the home gateway 10 and the Internet 6 to the Web server 5, and transmits and receives an electronic mail to and from the Web server 5. In the embodiment, each of the refrigerator 1, washing machine 2, microwave oven 3, electric rice cooker 4 and home terminal 9 communicates with the home gateway 10 by the Bluetooth.

The home terminal 9 is detachably attached to a front face of a door of the refrigerator 1 magnetically or mechanically. The home terminal 9 is powered from the refrigerator 1 side. The home terminal 9 is operable irrespective of the charged state of an integrated battery when powered from the refrigerator 1 side. The integrated battery is charged when the home terminal 9 is powered off. Further, the home terminal 9 is operated from the integrated battery when detached from the door of the refrigerator 1.

Figure 5:
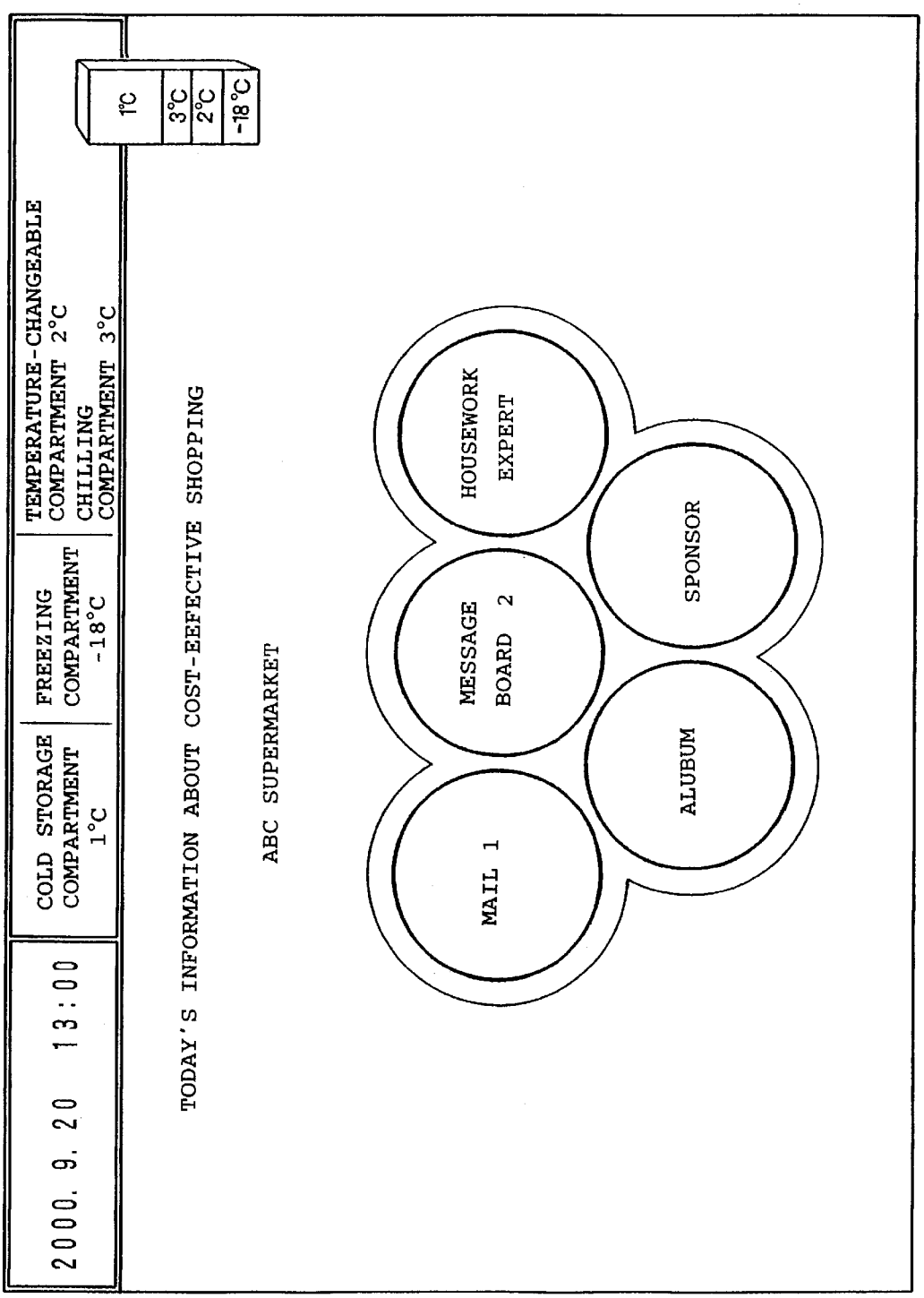
FIG. 5 illustrates a top page displayed on the home terminal unit.
Figure 6:
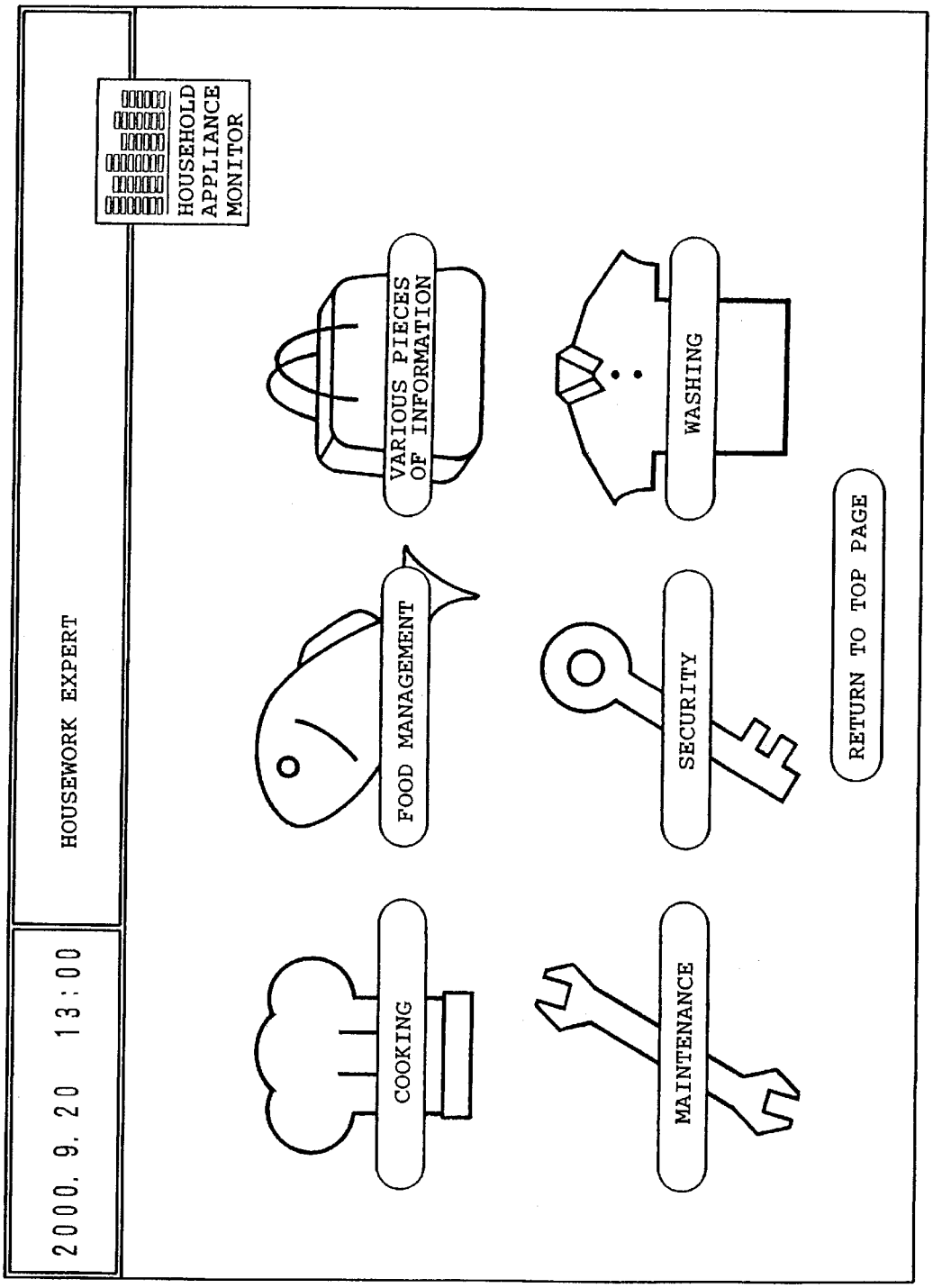
FIG. 6 illustrates a page of "housework expert" displayed on the home terminal unit.

The home terminal 9 is formed into the shape of a rectangular panel and includes a touch panel liquid-crystal display section 9a provided on an overall front face thereof. The display section 9a serves as informing means. A CPU, ROM, RAM, hard disk drive, battery none of which are shown are integrated on the backside of the liquid crystal display section 9a. The home terminal 9 includes a microphone and loud speaker (corresponding to informing means) so that voice can be recorded and reproduced. The microphone and loud speaker are used in a function of message board as shown in FIG. 5. The home terminal 9 functions as a server of the home LAN 8 comprising the household electric appliances including the refrigerator 1. When various menus displayed on the display section 9a are touched, the home terminal 9 accesses to the Web site provided by the manufacturer so that various pieces of information are downloaded. Furthermore, the home terminal 9 receives information about the operating state from the refrigerator 1 to transmit the information to the information to the Web server 5. Additionally, the home terminal 9 receives various programs and message data (corresponding to information) transmitted from the Web server 5.

The home gateway 10 as shown in FIG. 1 converts a protocol (Ethernet, Bluetooth, Echonet) so that the home terminal 9 can communicate with the household electric appliances. Furthermore, the home gateway 10 serves as a router connecting the Internet 6 to the home LAN 8. When serving as the router, the home gateway 10 also serves as a fire wall blocking improper input and output of data.

Figure 2:
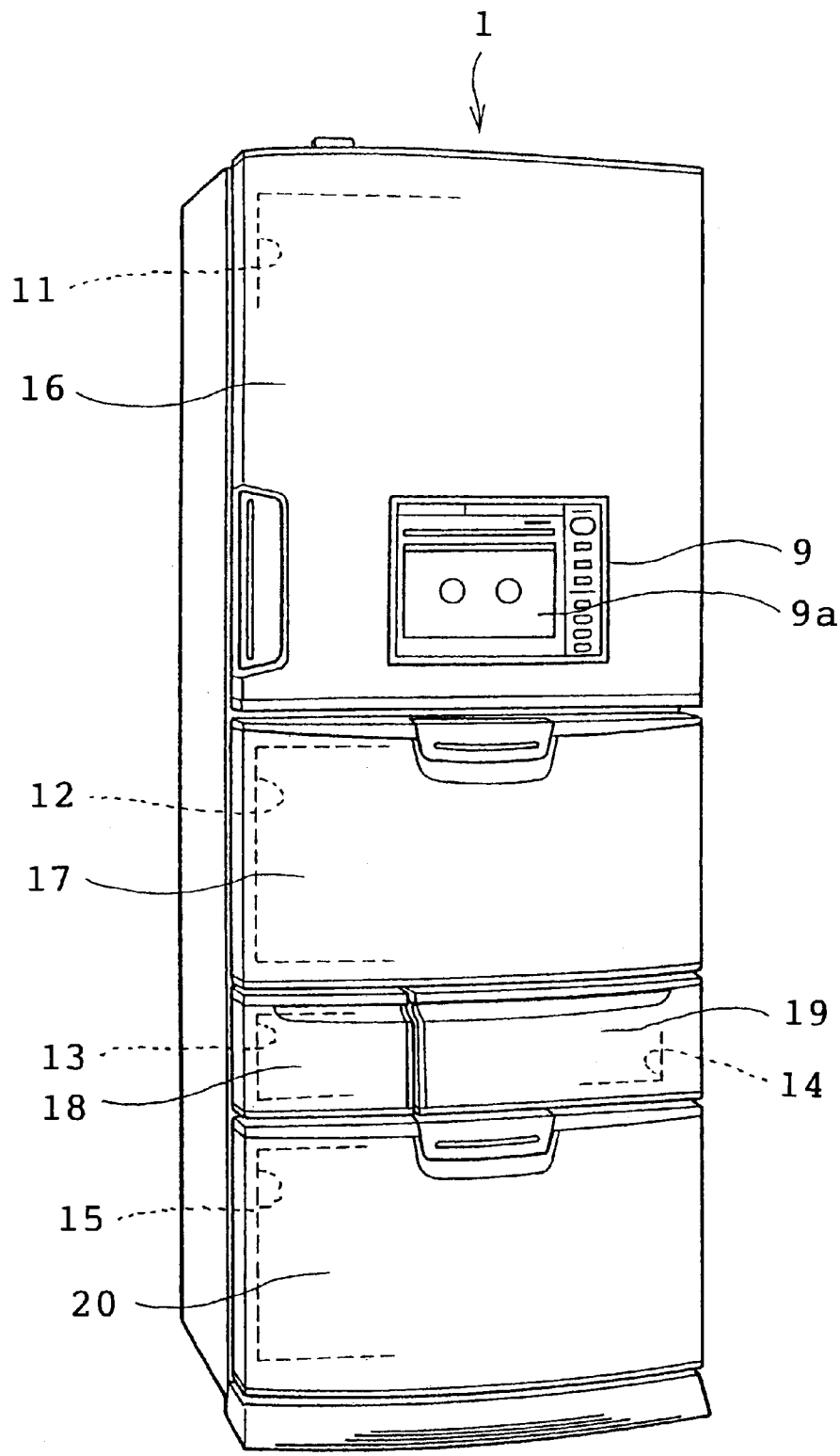
FIG. 2 is a perspective view of the refrigerator to which a home terminal unit is attached.

FIG. 2 shows the refrigerator 1 to which the home terminal 9 is attached. The refrigerator 1 comprises a body (not shown) defining therein a cold storage compartment 11, a vegetable compartment 12, an ice making compartment 13, a temperature-changeable compartment 14 juxtaposed with the ice making compartment, and a freezing compartment 15 sequentially in this order from the above. These compartments 11 to 15 are closed and opened by doors 16 to 20 respectively. The cold storage compartment 11 and the vegetable compartment 12 constitute a cold storage temperature zone, whereas the ice making compartment 13 and the freezing compartment 15 constitute a freezing temperature zone. A temperature in the temperature-changeable compartment 14 can be changed in a wide range, so that the compartment 14 is used as one of a freezing compartment, partially freezing compartment, chilling compartment, vegetable compartment, soft freezing compartment, cold storage compartment, wine compartment, and cool range compartment.

Figure 3:
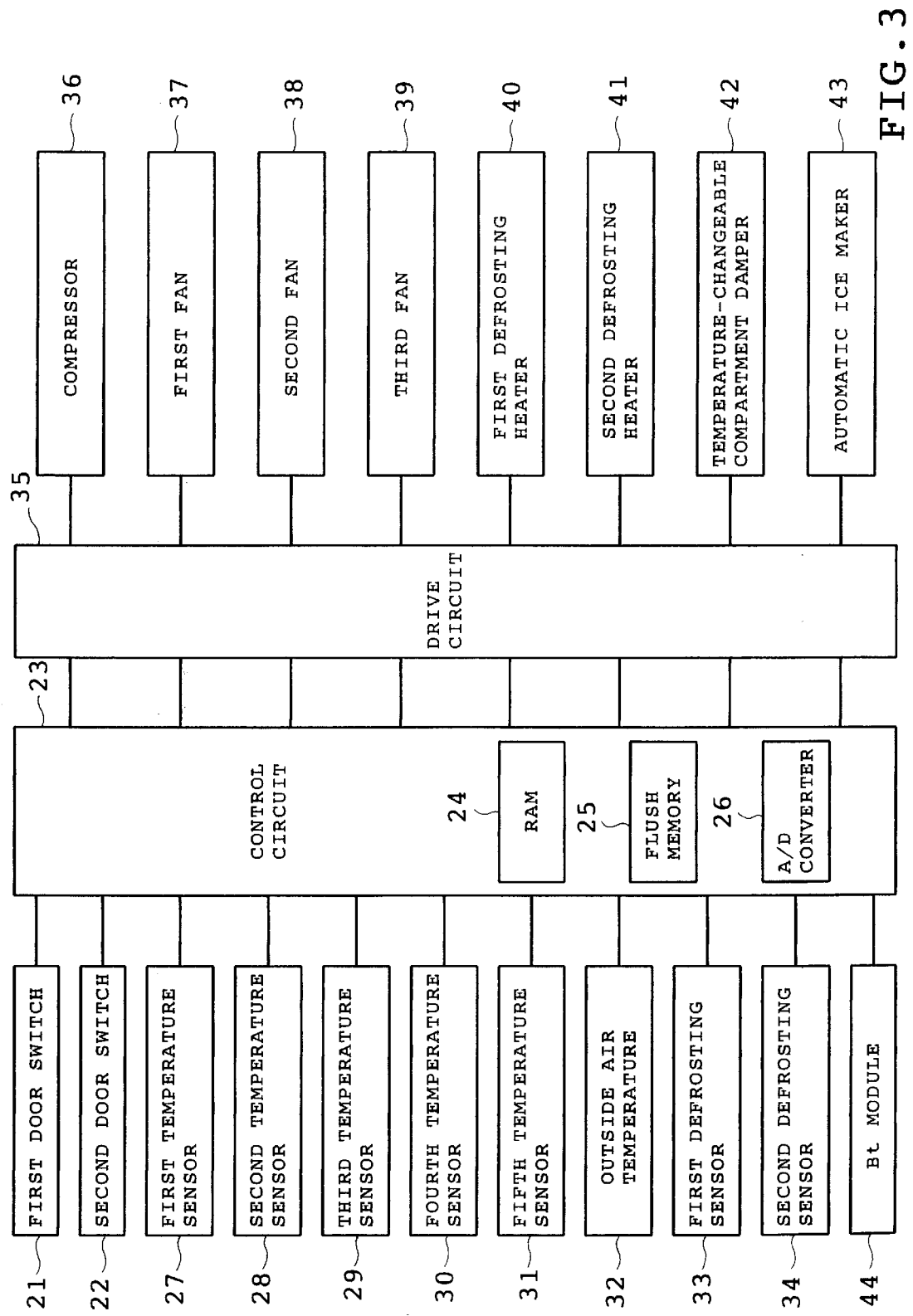
FIG. 3 is a block diagram showing an electrical arrangement of the refrigerator.

Referring to FIG. 3, a first door switch 21 and a second door switch 22 are provided on the doors 16 and 20 of the cold storage and freezing compartments 11 and 15 respectively. A control circuit 23 serving as control means comprises a microcomputer (not shown), a volatile memory or RAM 24 serving as storage means, a rewritable non-volatile memory or flush memory 25. Various sensors deliver respective analog signals to the microcomputer as will be described later. The microcomputer includes an A/D converter 26 for converting these analog signals to corresponding digital signals. A first temperature sensor 27 detects a temperature in the cold storage compartment 11. A second temperature sensor 28 detects a temperature in the vegetable compartment 12. A third temperature sensor 29 detects a temperature in the temperature-changeable compartment 14. A fourth temperature 30 detects a temperature in the freezing compartment 15. A fifth temperature sensor 31 detects the completion of ice making. A sixth temperature sensor 32 detects an outside temperature. A first defrosting sensor 33 detects the completion of defrosting concerning a first evaporator (not shown) for the cold storage compartment 11. A second defrosting sensor 34 detects the completion of defrosting concerning a second evaporator (not shown) for the freezing compartment 15. All of the sensors 27 to 34 deliver respective output signals to the control circuit 23. The signals are converted by the control circuit 23 to respective voltage signals, which are then supplied to the microcomputer. Each of the sensors 27 to 34 comprises a thermistor, for example.

The control circuit 23 further controls a drive circuit 35 to further control a compressor 36, a first fan 37 for the cold storage compartment 11, a second fan 38 for the freezing compartment 15, a third fan 39 for the compressor 36, a first defrosting heater 40 for the first evaporator, a second defrosting heater 41 for the second evaporator, a damper 42 for the temperature-changeable compartment 14, and an automatic ice maker 43. The damper 42 is provided with a switch (not shown) for detecting an open state or a closed state of the damper.

The automatic ice maker 43 is provided in an upper interior of the ice making compartment 13. A water-supply motor is driven so that water is supplied from a water-supply unit to an ice-making tray although none of these components are shown. When the fifth temperature sensor 31 detects completion of ice making, an ice removing motor (not shown) is driven to reverse the ice making tray so that ice cubes are removed from the tray. The drive circuit 35 includes current sensors (not shown) for detecting drive currents of the water-supply and ice removing motors respectively, motor drive current of the compressor 36, motor drive currents of the fans 37 to 39 respectively and motor drive current of the damper 42. Furthermore, communication means for connecting the refrigerator 1 to the home LAN 8, for example, a Bluetooth interface module 44, is connected to the control circuit 23. The module 44 is hereinafter referred to as "Bt module." The Bt module 44 may be built in the control circuit 23. An Ethernet module or Echonet module may be provided instead of the Bt module 44.

The operation of the remote inspection system will now be described. Firstly, the operation of the refrigerator 1 will be described in brief. The flush memory 25 of the control circuit 23 stores a control program executed by the microcomputer. The control program contains processing steps for a refrigerating operation including all the operations of the refrigerator 1 such as a defrosting operation and an ice making operation of the automatic ice maker 43. The control program further contains processing steps for transmission and receiving of information about operating state and various programs between the home terminal 9 and the microcomputer with use of the Bt module 44. The control program stored on the flush memory 25 can be rewritten through the medium of the Bt module 44. In this case, the control program is recorded on a recording medium or supplied from the Web server 5 via the Internet 6.

The microcomputer continuously executes the control program as long as the refrigerator 1 is powered from the power supply, carrying out a temperature control so that the temperatures in the compartments agree with set temperatures respectively. For example, the set temperature in the cold storage compartment 11 ranges from 1° C. to 5° C. The set temperature in the freezing compartment 15 ranges from −18° C. to −21° C. Each set temperature can be set in the unit of 1° C.

The control circuit 23 switches a flow passage of refrigerant in a refrigerating cycle on the basis of temperatures detected by the first and second temperature sensors 27 and 30 etc. More specifically, the atmosphere in the cold storage and vegetable compartments 11 and 12 is mainly refrigerated in a first refrigeration mode. The atmosphere in the ice making and freezing compartments 13 and 15 is mainly refrigerated in a second refrigeration mode. The control circuit 23 repeats the two refrigeration modes alternately to thereby execute the refrigerating operation. In this case, the control circuit 23 controls an ON-OFF state and rotational speed of each of motors of the first and second fans 37 and 38 according to the refrigeration mode. When the first fan 37 is driven, cold air refrigerated by the first evaporator is supplied into the cold storage and vegetable compartments 11 and 12. On the other hand, when the second fan 38 is driven, cold air refrigerated by the second evaporator is supplied into the ice making and freezing compartments 13 and 15. The control circuit 23 further controls a frequency of the compressor 36 according to the temperatures detected by the first and second temperatures 27 and 30. As a result, for example, when the detected temperatures are high, the frequency of the compressor 36 is increased so that the refrigerating performance is increased. For example, the compressor 36 is driven by a brushless DC motor, and the frequency control is carried out by an inverter.

The damper 42 is mainly controlled so as to be opened and closed for the temperature control for the temperature-changeable compartment 14 in the normal operation. More specifically, the control circuit 23 drives an electric motor of the damper 42 on the basis of the temperature detected by the third temperature sensor 29, whereby an amount of cold air supplied into the temperature-changeable compartment 14 is controlled so that the temperature in the temperature-changeable compartment 14 agrees with a set temperature according to a set operation mode.

The refrigeratory cooking (cool range) can be carried out in the temperature-changeable compartment 14. In the refrigeratory cooking, food whose temperature is relatively high is refrigerated without adversely affecting the other food stored in the temperature-changeable compartment 14. The user can select one of four refrigeratory cooking modes according to the type and condition of food.

The control circuit 23 further executes a pre-cool operation every time when an accumulated refrigerating time for the freezing compartment 15 reaches a predetermined time. Thereafter, a defrosting operation is carried out for each of the first and second evaporators. In the defrosting operation, the first and second defrosting heaters 40 and 41 are energized while the compressor 36 and the fans 37–39 are stopped. The defrosting operation is completed when the first and second defrosting sensors detect completion of defrosting. The setting of temperatures, mode of the temperature-changeable compartment 14 and mode of the refrigeratory cooking can be executed at the refrigerator 1 or the home terminal 9. Each of the refrigerator 1 and the home terminal 9 transmits the content of setting to the other. The setting can also be carried out at the Web server 5.

The control circuit 23 transmits data of temperatures detected by the first to fourth temperature sensors 27 to 30 to the home terminal 9 at predetermined intervals, for example, at intervals of one minute through the medium of the Bt module 44. The control circuit 23 further transmits to the home terminal 9 information about other operating conditions including ON-OFF states of the first and second door switches 21 and 22, temperatures detected by the sensors 31 to 34, the frequency and motor drive current of the compressor 36, the open or closed state of the damper 42, and drive currents of water-supply and ice-removing motors.

The home terminal 9 accumulates information about the operating condition of the refrigerator 1 transmitted via the home gateway 10 thereto from the refrigerator 1. The accumulated information is transmitted via the home gateway 10 and Internet 6 to the Web server 5 at predetermined intervals, for example, at intervals of one hours. In this case, the home terminal 9 also transmits set temperatures, the set mode of the temperature-changeable compartment 14, and the set mode of the refrigeratory cooking in the temperature-changeable compartment 14.

The remote inspection executed by the Web server 5 will now be described with reference to FIGS. 4 to 13. The liquid-crystal display section 9*a* of the home terminal 9 attached to the refrigerator 1 displays a top page as shown in FIG. 5. The display screen displays on an upper end thereof the current date, the temperature in the cold storage compartment, the temperature in the freezing compartment, the temperature in the temperature-changeable compartment, and the temperature in the vegetable compartment ("CHILLING" in FIG. 5). An appearance of the refrigerator 1 is displayed with the temperatures in the cold storage, vegetable, temperature-changeable and freezing compartments on the upper tight-hand corner of the display screen.

The top page includes menus of "MAIL," "MESSAGE BOARD," "HOUSEWORK EXPERT," "ALBUM" and "SPONSOR." The number of mails received is displayed with the menu of "MAIL." The number of messages recorded is displayed with the menu of "MESSAGE BOARD." When each menu on the display screen is touched, the processing for each menu is initiated. The menu of "ALBUM" has a function of recording, arranging and displaying still and dynamic images. The menu of "SPONSOR" has a function of providing information about advertisement.

When the menu of "HOUSEWORK EXPERT" is selected, a page of "HOUSEWORK EXPERT" is displayed. The "HOUSEWORK EXPERT" page contains menus to obtain various pieces of information and service (remote inspection for the refrigerator 1) useful in using household electric appliances. The menus include "COOKING," "FOOD MANAGEMENT," "INFORMATION," "MAINTENANCE," "SECURITY," "WASHING." When one of the menus on the display screen is touched, the processing for each menu is initiated. Furthermore, on the right-hand end of each display screen are displayed a refrigerator monitor setting button for changing the set temperatures of the refrigerator 1 and four mode setting buttons concerning temperatures in the cold storage, freezing and temperature-changeable compartments. See FIGS. 7 to 13.

Figure 7:
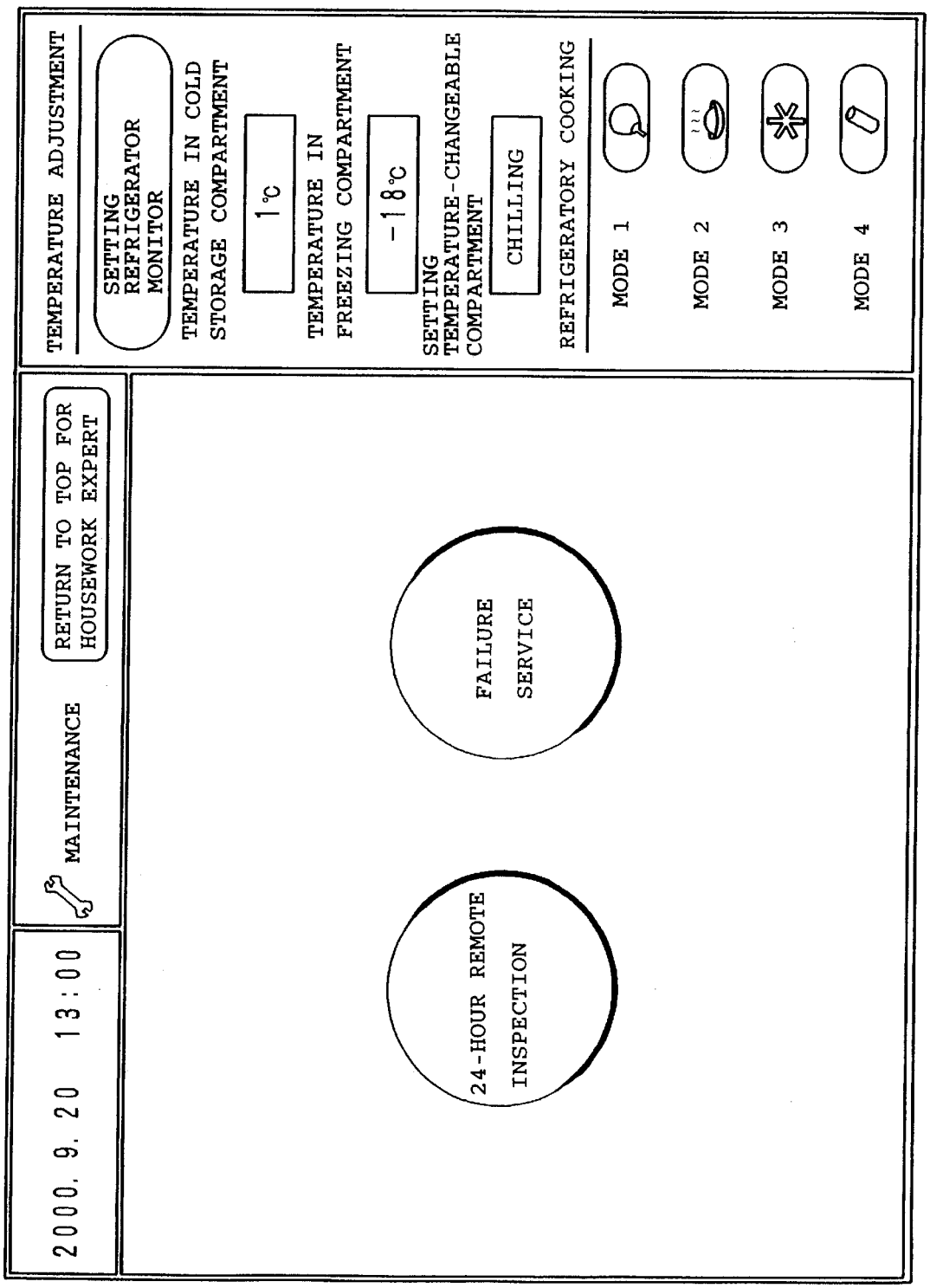
FIG. 7 illustrates a page of "maintenance" displayed on the home terminal unit.

When the menu of "MAINTENANCE" is selected on the page of "HOUSEWORK EXPERT," a page of "MAINTENANCE" as shown in FIG. 7 is displayed. The page of "MAINTENANCE" is set with two menus of "24-HOUR REMOTE INSPECTION" for the refrigerator 1 and "FAILURE SERVICE" for all the household electric appliances including the refrigerator 1. When the menu of "24-HOUR REMOTE INSPECTION" is selected, a page of "AUTOMATIC MONITOR OF REFRIGERATOR OPERATING CONDITION" is displayed. As a result, the contents of remote inspection of the refrigerator 1 by the Web server 5 can be viewed. When the menu of "FAILURE SERVICE" is selected, a contact can be made with a serviceman via the Web server 5 and inspection of the household electric appliances or other service can be requested.

Figure 8:
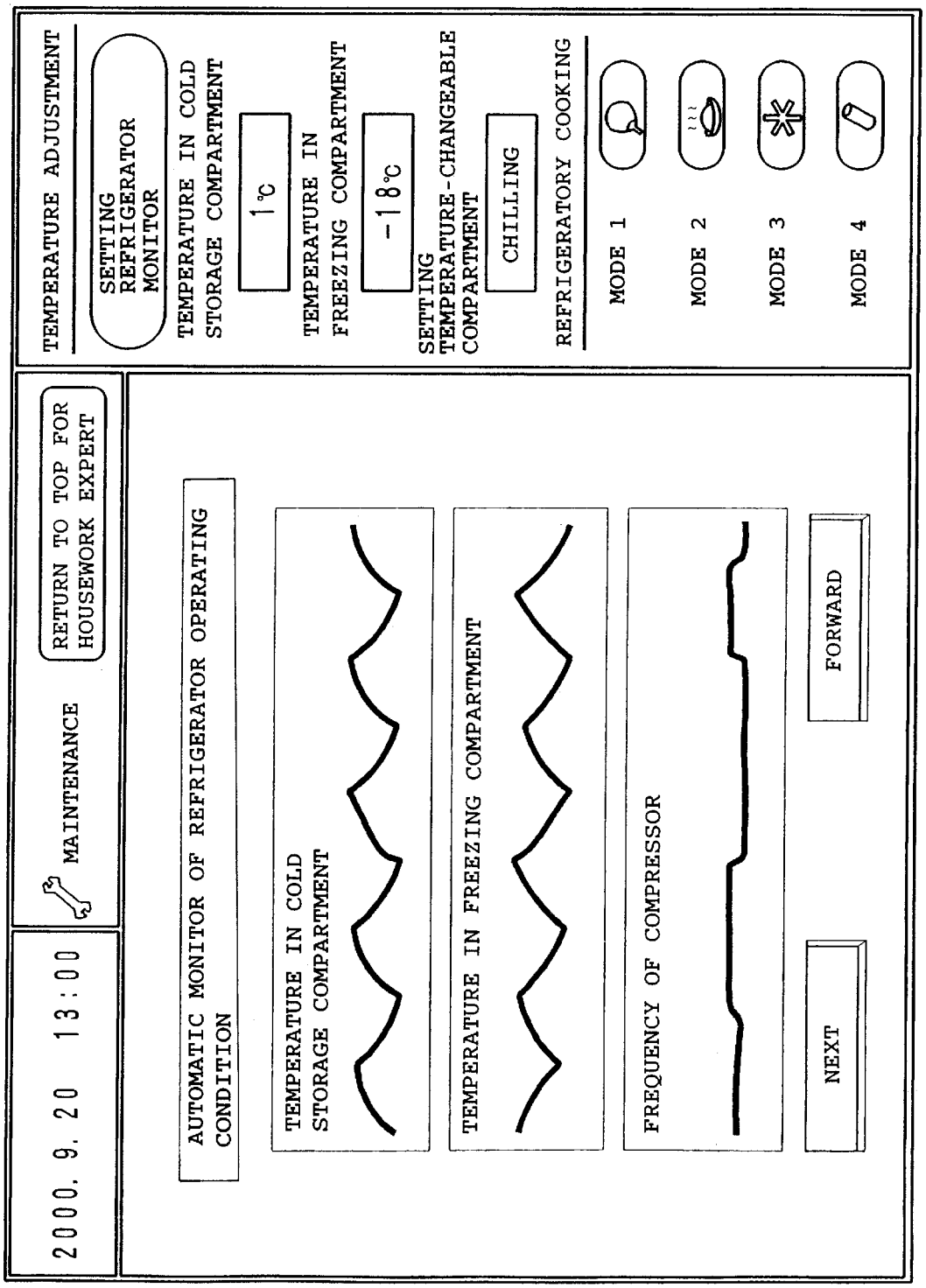
FIG. 8 illustrates a page of "automatic monitor of refrigerator operation" displayed on the home terminal unit.
Figure 9:
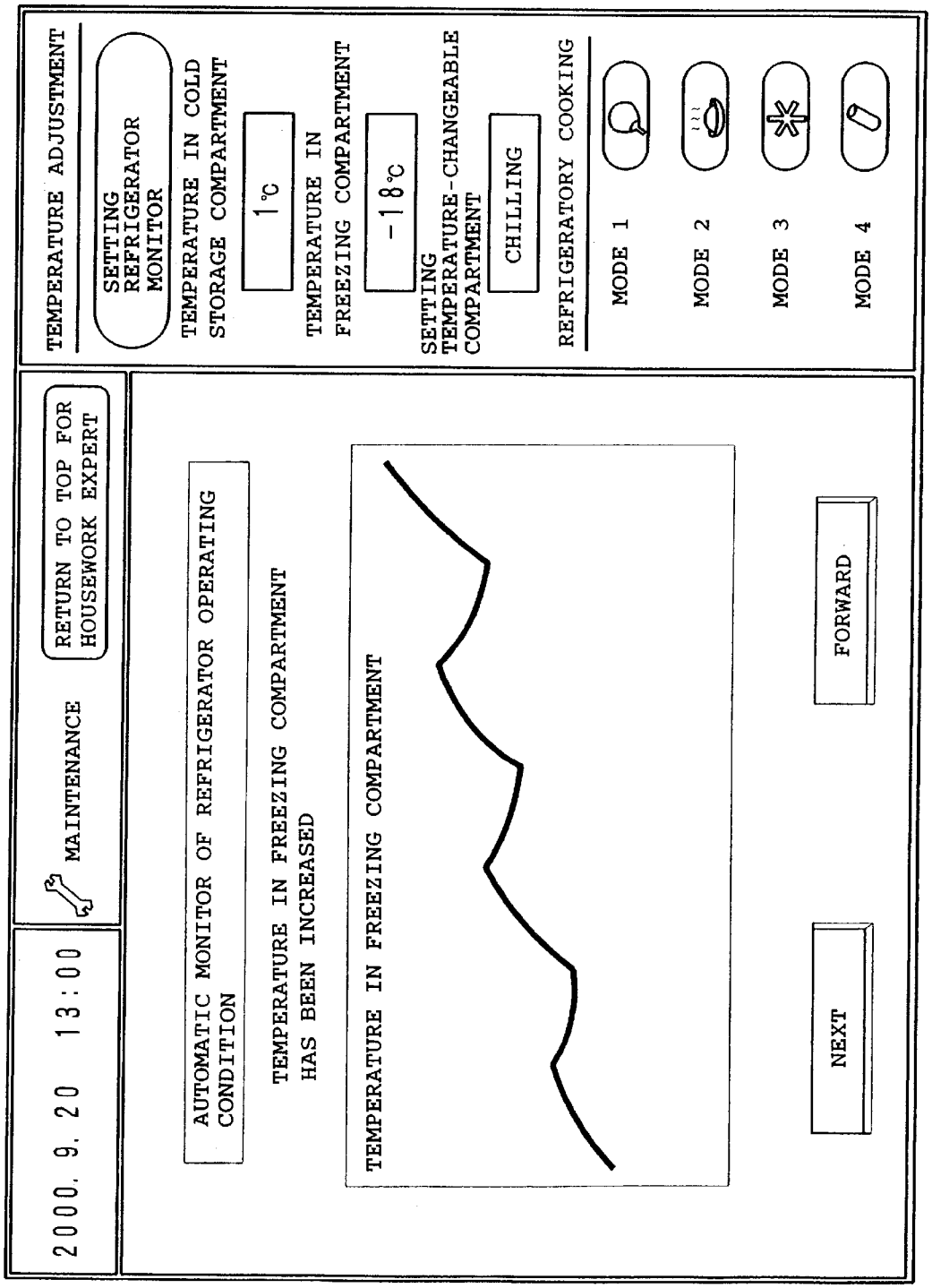
FIG. 9 also illustrates a page of "automatic monitor of refrigerator operation" displayed on the home terminal unit, showing a display screen in the case where the temperature in a freezing compartment is abnormal.

FIG. 8 shows the page of "AUTOMATIC MONITOR OF REFRIGERATOR OPERATING CONDITION" displayed when the menu of "24-HOUR REMOTE INSPECTION" has been selected. In this case, graphs showing changes in the temperatures in the cold storage and freezing compartments 11 and 15 and the frequency of the compressor 36 with lapse of time are displayed. In the graphs, inclinations of the temperatures in the cold storage and freezing compartments are opposite to each other. The reason for this is that the cold storage compartment refrigeration mode and the freezing compartment refrigeration mode are alternately repeated in the refrigerating operation.

Figure 4:
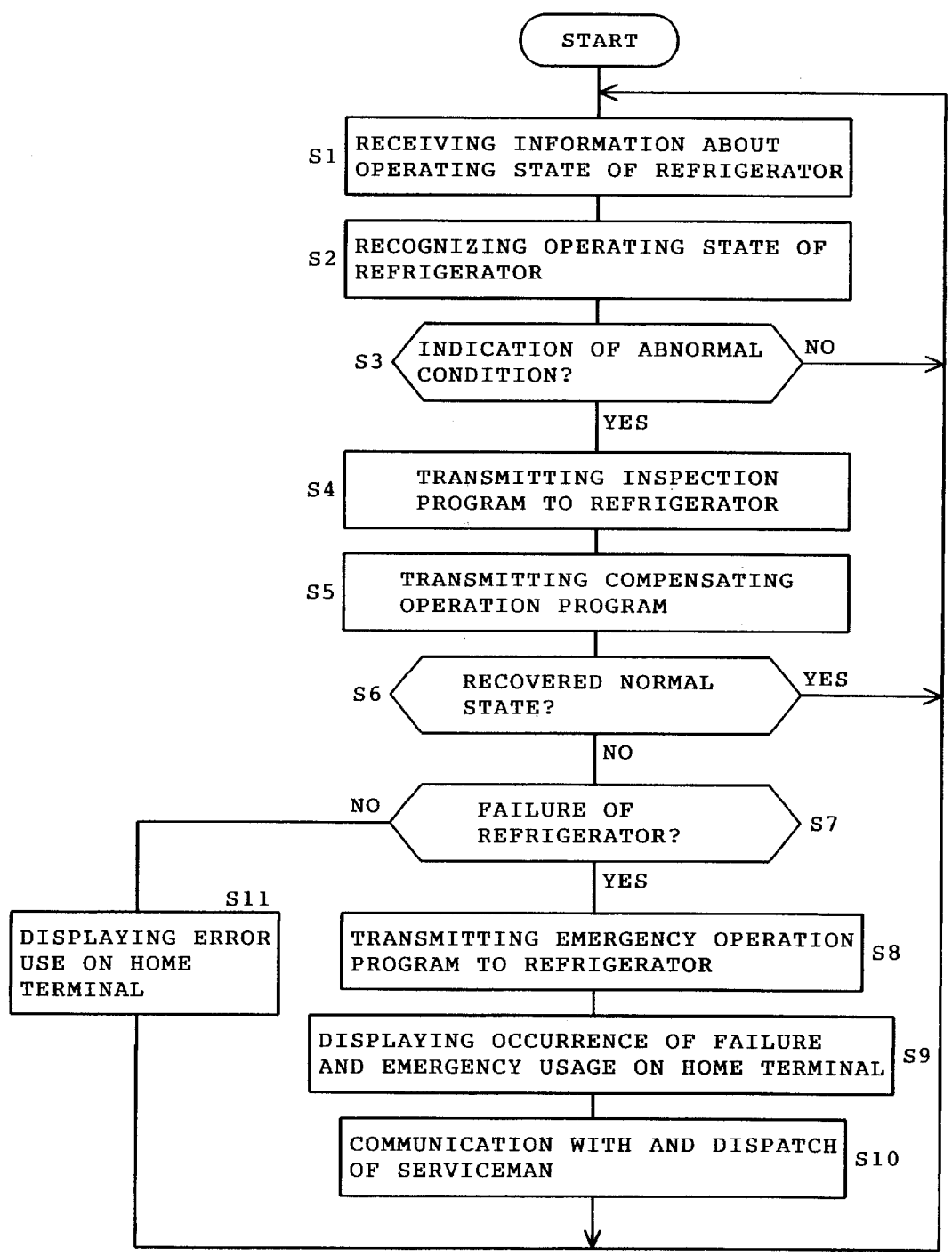
FIG. 4 is a flowchart of a remote inspection process by a Web server.

FIG. 4 shows a flowchart of the remote inspection program executed by the Web server 5. The program is recorded on a computer readable recording medium or supplied via the Internet 6. The Web server 5 receives information about the operating state of the refrigerator 1 from the home terminal 9 of each home at predetermined intervals, for example, at intervals of one hour 5 (step S1). The Web server 5 recognizes the operating state of the refrigerator 1 on the basis of the received information (step S2). The Web server 5 further compares the operating state (including outside temperature) with the standard data and operation patterns stored on the diagnosis data base 7, determining whether an indication of abnormal condition has appeared (step S3). When determining that no indication of abnormal condition has appeared (NO), the Web server 5 returns to step S1 to be in standby for subsequent information about operating state.

On the other hand, when the temperature in the freezing compartment 15 rises to exceed the set temperature range (from −18° C. to −21° C.), the Web server 5 determines that an indication of abnormal condition has appeared (YES). The Web server 5 then transmits the data of operating state indicative of the indication of abnormal condition (the temperature changes in the freezing compartment 15) and message data arousing user's attention. The home terminal 9 displays the graph of temperature changes in the freezing compartment 15 and the received message, "TEMPERATURE IN FREEZING COMPARTMENT HAS BEEN INCREASED."

The Web server 5 transmits an inspection program for inspecting the electric circuit and refrigerating cycle via the home terminal 9 to the refrigerator 1 (step S4). The inspection program is stored on the RAM 24 of the control circuit 23, for example and incorporated in the control program as a sub-routine so as to be executed dependent on the control program. Upon completion of execution of the inspection program, the result of inspection is transmitted from the refrigerator 1 via the home terminal 9 to the Web server 5.

Figure 10:
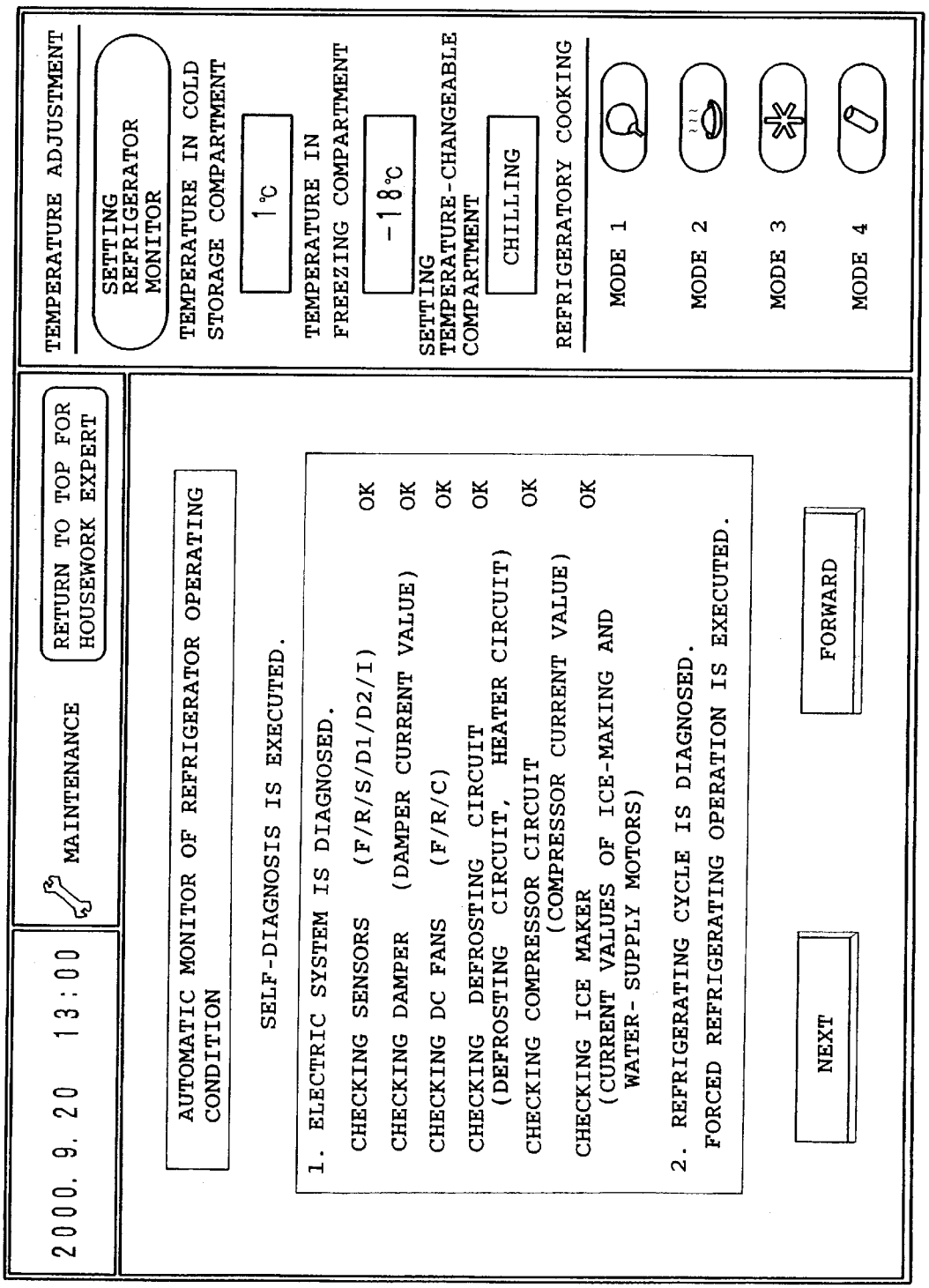
FIG. 10 also illustrates a page of "automatic monitor of refrigerator operation" displayed on the home terminal unit, showing a display screen in the case where inspection has been executed according to an inspection program.

The Web server 5 diagnoses the refrigerator 1 on the basis of the result of inspection, transmitting the result of diagnosis to the home terminal 9. The home terminal 9 displays the result of diagnosis on the screen as shown in FIG. 10. The indication of "SELF-DIAGNOSIS" on the display screen designates the inspection by the execution of the foregoing inspection program. The inspection program may previously be stored on the flush memory 25 as a part of the control program so that the inspection program is carried out on the basis of the instruction from the Web server 5.

The inspection program the Web server 5 transmits to the refrigerator 1 is necessary and sufficient to specify the cause for the indication of abnormal condition. In the example as shown in FIG. 10, the following inspection items are carried out. The number of inspection items is increased or decreased according to the indication of abnormal condition. The following items (1), (3) to (5) and (7) are carried out when the temperatures in the respective storage compartments have exceeded the set temperature ranges. Item (2) is carried out when the temperature in the temperature-changeable compartment 14 has exceeded the set temperature range. Item (6) is carried out when no ice is made.

(1) Checking Sensors

On the basis of an output value of the A/D converter 26, the temperature sensors 30, 27, 29 and 31, and the defrosting sensors 33 and 34 are inspected concerning the disconnection etc.

(2) Checking Damper

The drive motor of the damper 42 is inspected concerning defective on the basis of the motor drive current.

(3) Checking DC Fans

The drive motors of the fans 37 to 39 are inspected concerning defective on the basis of motor drive currents.

(4) Checking Defrosting Circuit

A defrosting circuit incorporated in the control circuit 23 and defrosting heaters 40 and 41 are inspected concerning failure in operation (failure of relays, photo-coupler or fuse) and disconnection.

(5) Checking Defrosting Circuit

The compressor motor and the inverter are inspected on the basis of the motor drive current of the compressor 36.

(6) Checking Defrosting Circuit

The water-supply motor and the ice-removing motor are inspected on the basis of the currents of the motors.

(7) Checking Compressor Circuit

A forced refrigerating operation is executed in which the frequency of the compressor 36 is preliminarily increased and the refrigerating operation is switched the first or second refrigerating mode according to the indication of the abnormal condition. It is determined whether the temperature in each of the storage compartments returns to the set temperature range.

The above-described inspection is carried out in the refrigerator 1 such that the Web server 5 obtains results of the inspection regarding the inspection items. In FIG. 4, the Web server 5 transmits a compensating operation program to the refrigerator 1 so that the refrigerator is recovered from the indication of the abnormal condition (step S5). The control program stored on the flush memory 25 is replaced by the compensating operation program. For example, when the temperature in the freezing compartment 15 has been increased, a compensating operation is executed in which the frequency of the compressor 36 is increased within a predetermined range, and an operating time under the second refrigeration mode is increased within a predetermined range.

Thereafter, the Web server 5 monitors the operating state of the refrigerator 1 and determines whether the refrigerator has returned to the normal operating state (step S6). When determining that the refrigerator 1 has returned to the normal operating state (YES), the Web server 5 transmits a message about the recovery of the refrigerator to the home terminal 9. The home terminal 9 displays the received message, "TEMPERATURE IN THE FREEZING COMPARTMENT HAS BEEN RECOVERED." As an example of the recovery of the normal operating state by the compensating operation, the case may be considered where food whose temperature is excessively high was put into the freezing compartment 15 with the refrigerator 1 having no failure.

On the other hand, when determining that the refrigerator 1 has not returned to the normal operating state (NO), the Web server 5 determines which the abnormal condition appeared in the operating state of the refrigerator 1 results from, a failure of the refrigerator or an improper use by a user (step S7). The determination is based on data stored on the diagnosis data base 7. For example, an increasing pattern of the temperature in the freezing compartment 15 differs between the case of a failure of the refrigerator 1 and the case where the door of the freezing compartment is half open such that the second door switch 22 cannot detects the open state. Accordingly, the Web server 5 refers to the increasing pattern of the temperature stored on the diagnosis data base 7 to determine which of the causes the abnormal condition results from.

When determining that the abnormal condition results from the failure of the refrigerator 1 (YES), the Web server 5 refers to the results of inspection to specify a location of the failure, transmitting an emergency operation program to the refrigerator 1 (step S8). The compensating operation program stored on the flush memory 25 is replaced by the emergency operation program. The refrigerating operation is continued according to the emergency operation program until the serviceman completes the repair, so that the temperatures in the storage compartments are maintained in the normal temperature ranges respectively. For example, when the first or second defrosting sensor 33 or 34 is in an abnormal condition such that the refrigerator 1 has not recovered from the defrosting operation, the refrigerator is forced from the defrosting operation into the refrigerating operation.

Figure 11:
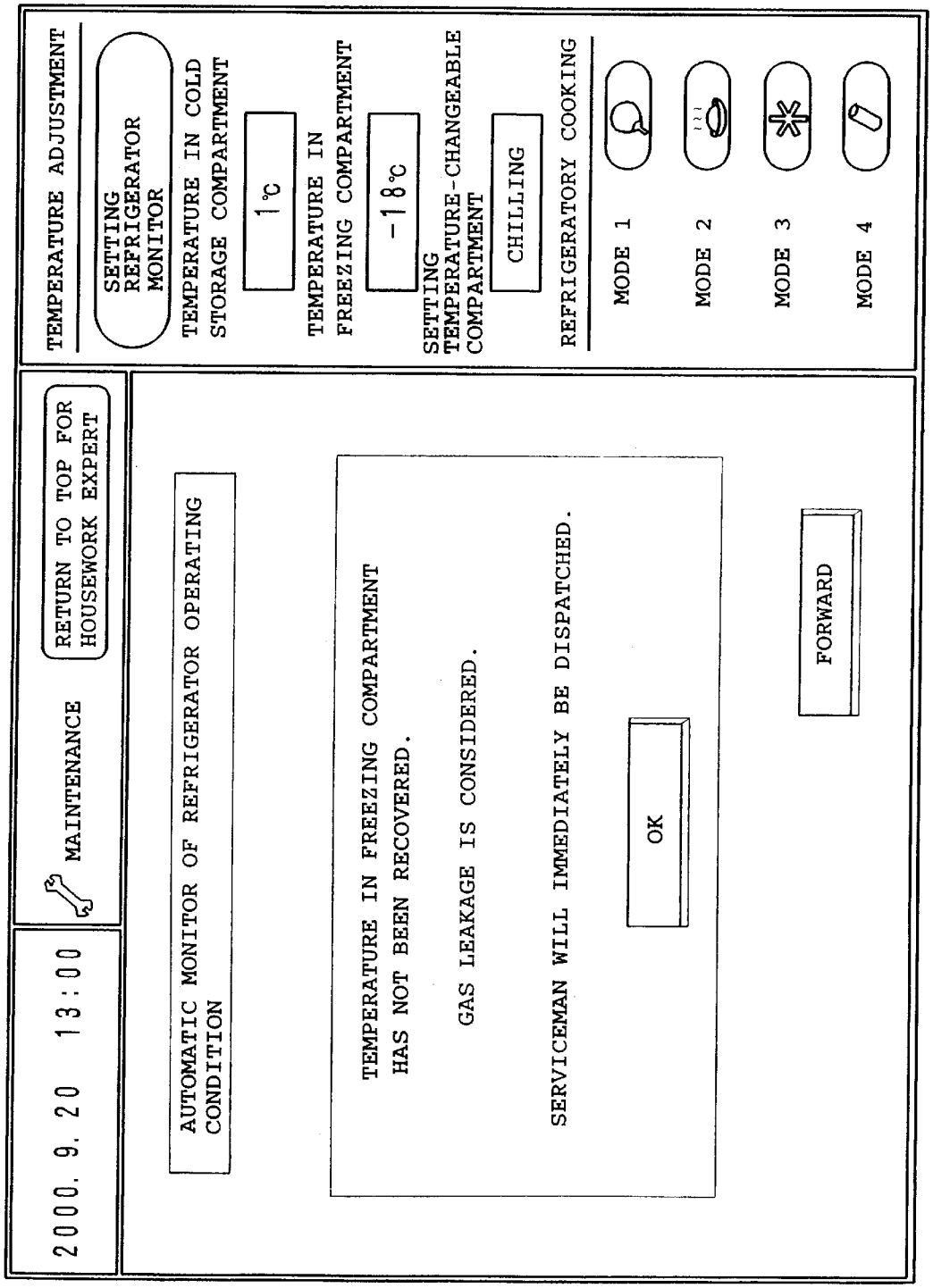
FIG. 11 also illustrates a page of "automatic monitor of refrigerator operation" displayed on the home terminal unit, showing the case where it has been determined that the abnormal condition results from a failure of the refrigerator.

The Web server 5 further transmits to the home terminal 9 data of a message informing that the refrigerator 1 has not recovered from the abnormal state, of the location of failure, and that a serviceman should be requested (step S9). The home terminal 9 displays the received message, "TEMPERATURE IN FREEZING COMPARTMENT HAS NOT BEEN RECOVERED. GAS LEAKAGE IS CONSIDERED. SERVICEMAN WILL IMMEDIATELY DISPATCHED." As shown in FIG. 11 (in the case where gas leakage in the compressor 36 is a cause for the failure). Additionally, when only the temperature in the temperature-changeable compartment is abnormal, the Web server 5 causes the home terminal 9 to display a message of usage in emergency, "TEMPERATURE IN TEMPERATURE-CHANGEABLE COMPARTMENT DOES NOT DROP. MOVE FOOD IN TEMPERATURE-CHANGEABLE COMPARTMENT TO COLD STORAGE OR FREEZING COMPARTMENT." Furthermore, as another example, when the refrigerating performance of the freezing compartment 15 is reduced, the Web server 5 causes the home terminal 9 to display a message of usage in emergency, "ATMOSPHERE IN FREEZING COMPARTMENT CANNOT BE REFRIGERATED SUFFICIENTLY. DO NOT OPEN AND CLOSE DOOR OF FREEZING COMPARTMENT TOO MUCH."

With this, the Web server 5 displays on the display 5a necessity of dispatch of a serviceman, the location of failure, the type of the refrigerator 1, the address, name, telephone number, facsimile number, and mail address of the user. In reply to the displayed contents, the serviceman arranges parts and components, communicates with the user by telephone, facsimile, electronic mail, etc., and make a schedule of dispatch.

Figure 12:
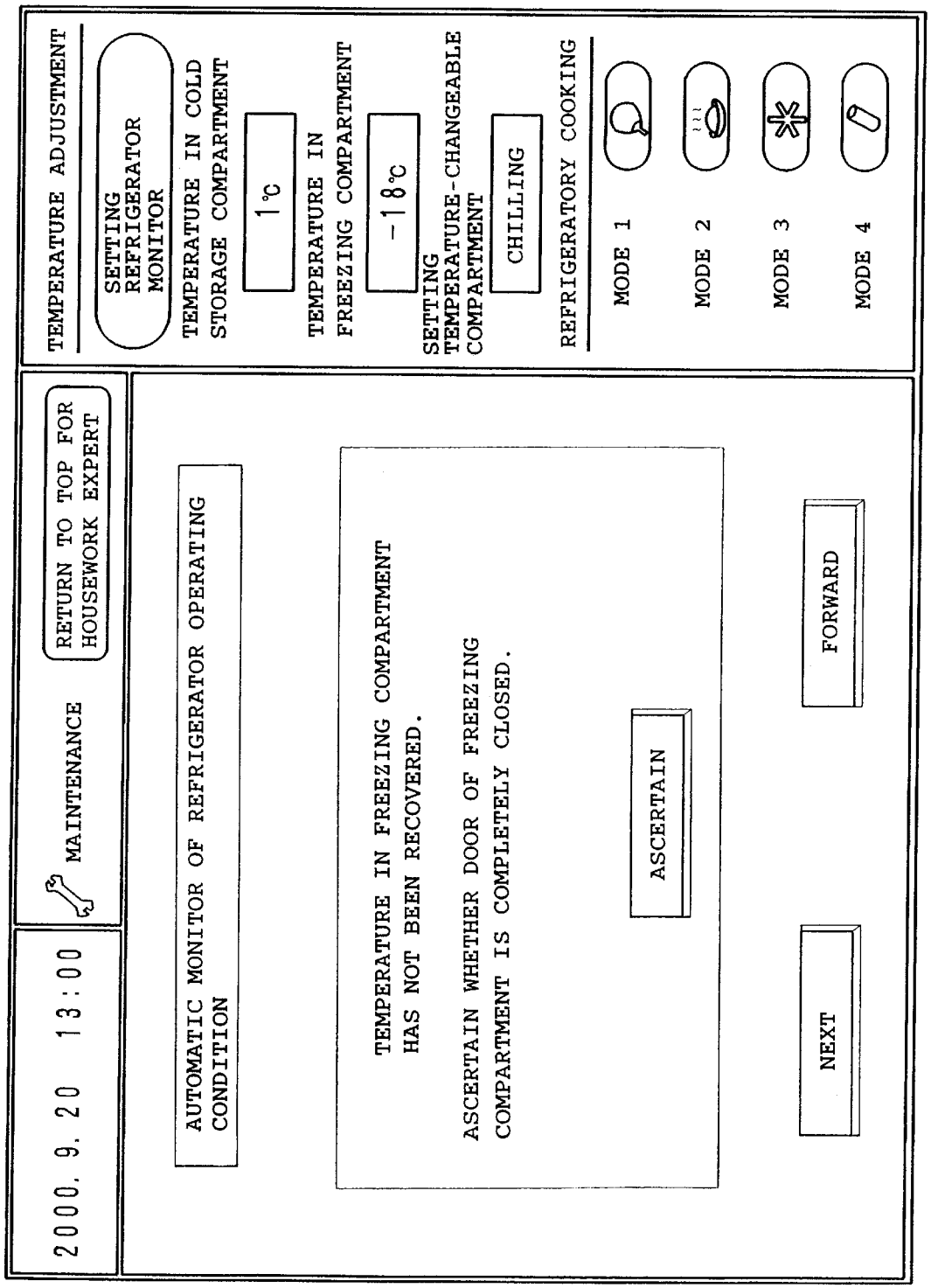
FIG. 12 also illustrates a page of "automatic monitor of refrigerator operation" displayed on the home terminal unit, showing a display screen in the case where it has been determined that the abnormal condition results from an improper use by the user.
Figure 13:
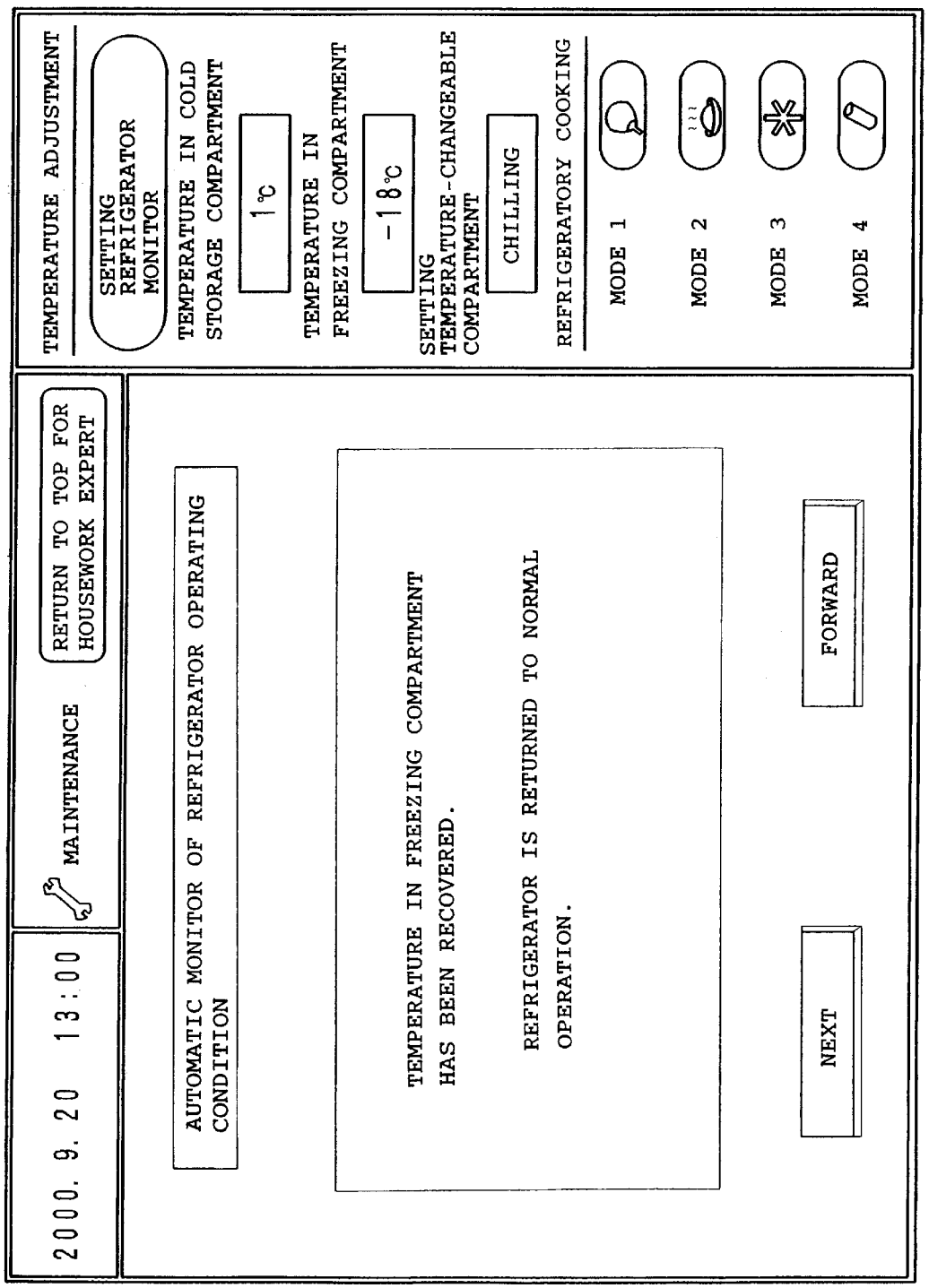
FIG. 13 also illustrates a page of "automatic monitor of refrigerator operation" displayed on the home terminal unit, showing a display screen in the case where a normal operating state has been recovered.

On the other hand, when determining that the abnormal condition results from an improper use by a user (NO), the Web server 5 transmits to the home terminal 9 data of a message for urging confirmation of the operation mode (step S11). The home terminal 9 displays the received message, "TEMPERATURE IN FREEZING COMPARTMENT HAS NOT BEEN RECOVERED. ASCERTAIN WHETHER DOOR OF FREEZING COMPARTMENT IS COMPLETELY CLOSED." as shown in FIG. 12. An ascertaining button is displayed below the message. When the button is touched, the Web server 5 recognized that the user has ascertained. When the door 20 of the freezing compartment is completely closed by the user such that the normal operating mode has been recovered, the Web server 5 transmits data of a message to the home terminal 9 to inform of recovery. The home terminal 9 displays the received message, "TEMPERATURE IN FREEZING COMPARTMENT HAS BEEN RECOVERED." as shown in FIG. 13.

According to the foregoing embodiment, the refrigerator 1 connected to the home LAN 8 is further connected via the home terminal 9 serving as the home server and the Internet 6 to the Web server 5, so that the information about the operating state of the refrigerator is automatically transmitted to the Web server at the predetermined intervals. Based on the information about the operating state transmitted from the refrigerator 1 and the accumulated information of the diagnosis data base 7, the Web server 5 continuously monitors the refrigerator 1. Consequently, the Web server 5 can quickly finds an abnormal condition of the refrigerator or an indication of the abnormal condition.

Refrigerators are kept under operation day and night (for 24 hours). In this respect, the refrigerators differ from many of the other household electric appliances. Accordingly, when the Web server 5 remote inspects the refrigerator 1 for the user, food stored therein can be coped with before being damaged or the damage is small. Consequently, convenience of the refrigerator can be improved. Further, the automatic remote inspection can give a sense of safety to the user. On the other hand, the manufacturer of the refrigerator can intensively manage information about abnormal conditions occurred in the market. By making use of the information, the data of the diagnosis data base 7 can be improved in the quality such that the accuracy in the remote inspection of the refrigerator 1 can be improved.

When an indication of the abnormal condition appears, the Web server 5 transmits the inspection program to the refrigerator 1 so that the refrigerator 1 is electrically inspected and the refrigerating cycle is inspected. According to this method, detailed information can be obtained about the cause of the indication of the abnormal condition on the basis of the results of the inspection. Furthermore, the control circuit 23 of the refrigerator 1 need not previously store any self-diagnosis program concerning various indications of abnormal conditions expected to occur. Accordingly, the capacity of the flush memory 25 can be reduced. Additionally, the Web server 5 refers to the diagnosis data base 7 to execute a most suitable inspection program according to the indication of the abnormal condition. Consequently, precise information can be obtained about the cause for occurrence of the abnormal condition.

In the foregoing embodiment, the drive circuit 35 is provided with current sensors detecting drive currents of the water-supply motor, ice-removing motor, compressor motor, fan motors and damper motor respectively. Consequently, a location of failure can easily be specified since the Web server 5 can refer to current values. In the above-described system, the Web server 5 thus specifies the location of failure as well as the presence or absence of abnormal condition. Accordingly, the serviceman can previously arrange replacement parts or components for the location of failure. Furthermore, the serviceman can carry all the necessary replacement parts or components with him when going for repair and start repair upon arrival at the user's home. Consequently, the serviceman need not visit the user's home repeatedly such that the refrigerator can be repaired in a short period of time.

Furthermore, when the temperature in each storage compartment exceeds the set temperature range, the Web server 5 transmits the compensating operation program to the refrigerator 1 to recover the refrigerator from the abnormal condition. Consequently, an increase in the temperature of the food stored in each storage compartment can be limited such that a reduction in the freshness of the food can be rendered minimum. Additionally, even if the refrigerator 1 is in good order, the temperature in each storage compartment sometimes exceeds the set temperature range when the refrigerator 1 is installed in a high-temperature environment or when the door 20 of the refrigerating compartment 15 is opened and closed frequently. Thus, when an abnormal condition results from the environment in which the refrigerator 1 is installed or a using manner, an insufficiency in the refrigeration can be improved by causing the refrigerator 1 to carry out a compensating operation program in which parameters and an operating mode are changed.

When determining that the abnormal condition results from an improper use by the user, the Web server 5 causes the home terminal 9 to display a message urging the user to confirm the using manner and further causes the user to operate the refrigerator 1 for confirmation. Consequently, the user can be prevented from misunderstanding the abnormal condition as a failure such that an unnecessary request for repair can be prevented. Furthermore, when determining that the abnormal condition results from the failure in the refrigerator 1, the Web server 5 transmits the emergency operation program to the refrigerator 1 so that the refrigerator is temporarily operated. Consequently, damage or a reduction in the freshness of the food stored in the refrigerator can be prevented until the repair by the serviceman is completed, or an inconvenience that the refrigerator 1 cannot be used can be limited to the minimum. Additionally, the Web server 5 causes the home terminal 9 to display the message informing of the occurrence of failure and the temporary usage. Consequently, the frequency in the foregoing damage or inconvenience can further be reduced.

The refrigerator 1 may be provided with a function of connecting itself via the Internet 6 to the Web server 5. In this case, the refrigerator 1 can be used without being connected to the home LAN 8. Further, the refrigerator 1 and the home terminal 9 may be integrated together so that the refrigerator has a function as a home server.

The remote inspection device may or may not have a function of the Web server providing messages by the Web site. Further, the refrigerator 1 may be connected to the remote inspection device via a public communication network other than the Internet. The home terminal 9 is usually attached to the door 16 of the refrigerator 1 in use. However, the home terminal 9 may be hung on a wall, attached to another household electric appliance or placed on a table in use. Furthermore, the home terminal 9 transmits the information about the operating state of the refrigerator 1 via the home gateway 10 and Internet 6 to the Web server 5 at the intervals of one hour. The intervals are not limited by "one hour." Additionally, the home terminal 9 may continuously be in connection with the Internet, and the information about the operating state of the refrigerator may be transmitted at intervals of a shorter time, for example, one minute.

The home terminal 9 transmits to the Web server 5 a large amount of information about the operating condition of the refrigerator 1 at the predetermined intervals. However, the home terminal 9 may usually transmit only the minimum information about the operating state of the refrigerator and more detailed information when an indication of an abnormal condition appears.

The Web server 5 need not transmit the inspection program to the refrigerator 1 when a cause for the abnormal condition can immediately be specified on the basis of the information about the operating state transmitted from the refrigerator 1. Further, when the abnormal condition in the operating state is slight and can be cope with only by the change in the set temperature, the Web server 5 may instruct the refrigerator 1 or the home terminal 9 to change the set temperature, instead of transmitting the compensating operation program to the refrigerator 1. In this case, the home terminal 9 preferably displays a message informing that a set temperature has been automatically changed. Additionally, the refrigerator 1 executes the inspection program in the foregoing embodiment. However, the home terminal 9 may be arranged to instruct the control circuit 23 to execute the inspection.

When determining that the refrigerator 1 has failed, the Web server 5 causes the refrigerator 1 to execute the temporary operation. However, the temporary operation should not be executed when the food stored in the refrigerator is not adversely affected, when the failure is serious so that the refrigerating operation cannot be performed even by the temporary operation, or when a continuous operation will result in a secondary failure.

The control circuit 23 of the refrigerator 1 may be provided with a simple self-diagnosis function so that when an indication of abnormal condition appears as the result of the self-diagnosis, the refrigerator accesses to the Web server 5 to request a detailed remote inspection. Furthermore, the Web server 5 causes the liquid-crystal display section 9a of the home terminal 9 to display various messages according to the operating state of the refrigerator 1 and the results of inspection. With this, a voice message or an alarming sound may be produced by a speaker or buzzer of the home terminal 9.

The foregoing remote inspection system may be applied to any household electrical appliance having communication means with the outside and an electric circuit for detecting the operating state, for example, various sensors and the control program is written on a re-writable storage means (for example, a flush memory). Such appliances include air conditioners, microwave ovens, washing machines, televisions and video recorders.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A remote inspection device for a refrigerator comprising:
    communication means for receiving information about an operating state of the refrigerator transmitted from the refrigerator via a communication network continuously or at predetermined intervals;
    a data base regarding the operating state of each type of the refrigerator to be inspected, the data base being used to determine whether an abnormal condition appeared in the operating state of the refrigerator results from a failure of the refrigerator or an improper use of the refrigerator by a user; and
    inspection means for inspecting the refrigerator on the basis of the received information and the data base.

2. A remote inspection device for a refrigerator comprising:
    communication means for receiving information about an operating state of the refrigerator transmitted from the refrigerator via a communication network continuously or at predetermined intervals, the communication means being transmissible to the refrigerator connected via the communication network to the communication means; and
    inspection means for inspecting the refrigerator on the basis of the received information and causing the communication means to transmit, to the refrigerator, an operating program or information required according to a result of inspection of the refrigerator.

3. A method of remote inspection for a refrigerator, comprising:
    receiving information about an operating state of the refrigerator transmitted from the refrigerator via a communication network continuously or at predetermined intervals; and
    inspecting the refrigerator on the basis of the received information, transmitting an inspection program via the communication network to the refrigerator and executing the inspection program when an indication of an abnormal condition is detected regarding the operating state of the refrigerator.

4. A method of remote inspection for a refrigerator, comprising:
    receiving information about an operating state of the refrigerator transmitted from the refrigerator via a communication network continuously or at predetermined intervals; and
    inspecting the refrigerator on the basis of the received information, transmitting a compensating operation program via the communication network to the refrigerator when an indication of an abnormal condition is detected regarding the operation state of the refrigerator, the program recovering the refrigerator from the indication of the abnormal condition, and executing the compensating operation program.

5. A method of remote inspection for a refrigerator, comprising:
    receiving information about an operating state of the refrigerator transmitted from the refrigerator via a communication network continuously or at predetermined intervals; and
    inspecting the refrigerator on the basis of the received information, referring to a data base regarding the operating state of each type of the refrigerator to be inspected, and determining whether an abnormal condition appeared in the operating state of the refrigerator results from a failure of the refrigerator or an improper use of the refrigerator by a user.

6. A method according to claim 5, wherein the inspecting step includes transmitting information via the communication network to the refrigerator when it is determined that the abnormal condition results from the improper use of the refrigerator by the user, said transmitted information being indicative of an improper use of the refrigerator.

7. A method according to claim 5, wherein the inspecting step includes referring to the data base to specify a location of the failure when it is determined that the abnormal condition results from the failure of the refrigerator.

8. A method according to claim 5, wherein the inspecting step includes transmitting an emergency operation program via the communication network to the refrigerator and executing the emergency operation program when it is determined that the abnormal condition results from the failure of the refrigerator.

9. A method according to claim 8, wherein the inspecting step includes transmitting information indicative of occurrence of failure via the communication means to the refrigerator and causing informing means to deliver the information.

10. A method according to claim 9, wherein the inspecting step includes transmitting information indicative of an emergency measure via the communication means to the refrigerator and causing informing means to deliver the information.

11. A refrigerator comprising:
    communication means communicating via a communication network a remote inspection device provided for inspecting an operating state of the refrigerator; and
    control means for transmitting to the remote inspection device information about the operating state of the refrigerator by using the communication means continuously or at predetermined intervals, the control means further executing a process according to an operating command delivered from the remote inspection device and received by the communication means.

12. A refrigerator according to claim 11, which further comprises informing means and wherein the control means delivers to the informing means information about the operating state of the refrigerator and the information transmitted from the remote inspection device to the control means.

13. A method of controlling a refrigerator comprising:

transmitting information about an operating state of the refrigerator via a communication network to a remote inspection device continuously or at predetermined intervals, the remote inspection device being provided for inspecting an operating state of the refrigerator; and executing a process according to an operating command transmitted via the communication network from the remote inspection device.

14. A method according to claim 13, wherein the process executing step includes executing a program transmitted from the remote inspection device.

15. A method according to claim 13, wherein the process executing step includes delivering to informing means information transmitted from the remote inspection device.

16. A recording medium on which a program for operating a refrigerator is recorded, the program carrying out:

transmitting information about an operating state of the refrigerator via a communication network to a remote inspection device continuously or at predetermined intervals, the remote inspection device being provided for inspecting the operating state of the refrigerator; and controlling a process according to an operating command transmitted via the communication network from the remote inspection device.

17. A program for operating a refrigerator, the program carrying out:

transmitting information about an operating state of the refrigerator via a communication network to a remote inspection device continuously or at predetermined intervals, the remote inspection device being provided for inspecting the operating state of the refrigerator; and controlling a process according to an operating command transmitted via the communication network from the remote inspection device.

18. A remote inspection system comprising:

a refrigerator transmitting information about an operating state of the refrigerator via a communication network continuously or at predetermined intervals; and a remote inspection device externally accessed via the communication network to inspect the refrigerator on the basis of the information about the operating state transmitted from the refrigerator.

19. A remote inspection system according to claim 18, further comprising a terminal unit interposed between the refrigerator and the communication network for obtaining information about an operating state from the refrigerator and transmitting the obtained information via the communication network to the remote inspection device, the terminal unit receiving a program or information transmitted via the communication network from the remote inspection device to supply the received program or information to the refrigerator.

20. A remote inspection system according to claim 19, wherein the terminal unit includes informing means for delivering the information about an operating state of the refrigerator and information transmitted from the remote inspection device.

21. A remote inspection system according to claim 18, wherein when an indication of abnormal condition is detected regarding the operating state of the refrigerator, the remote inspection device transmits an inspection program via the communication network to the refrigerator, and the refrigerator inspects the indication of the abnormal condition according to the received inspection program.

22. A remote inspection system according to claim 18, wherein when an indication of abnormal condition is detected regarding the operating state of the refrigerator, the remote inspection device transmits a compensating operation program via the communication network to the refrigerator, and the refrigerator executes a compensating operation to recover from the indication of abnormal condition.

23. A remote inspection system according to claim 18, wherein the remote inspection device includes a data base regarding an operating state of each type of the refrigerator to be inspected, and the remote inspection device refers to the data base to determine whether an abnormal condition appeared in the operating state of the refrigerator results from a failure of the refrigerator or an improper use of the refrigerator by a user.

24. A remote inspection system according to claim 23, wherein the remote inspection device transmits information via the communication network to the refrigerator, the information being indicative of an improper use of the refrigerator, and the refrigerator includes informing means and delivers to the informing means the received information.

25. A remote inspection system according to claim 23, wherein when determining that the abnormal condition results from the failure of the refrigerator, the remote inspection device refers to the data base to specify a location of the failure.

26. A remote inspection system according to claim 23, wherein when determining that the abnormal condition results from the failure of the refrigerator, the remote inspection device transmits an emergency operation program via the communication network to the refrigerator, and the refrigerator executes an emergency operation according to the emergency operation program.

27. A remote inspection system according to claim 26, wherein the remote inspection device transmits information via the communication network to the refrigerator, said information being indicative of occurrence of a failure, and the refrigerator includes informing means and delivers the received information to the informing means.

28. A remote inspection system according to claim 27, wherein the remote inspection device transmits information indicative of an emergency measure via the communication network to the refrigerator, and the refrigerator delivers the received information to the informing means.

* * * * *